United States Patent
Han

(10) Patent No.: US 8,600,434 B2
(45) Date of Patent: Dec. 3, 2013

(54) METHOD AND APPARATUS OF CELL SEARCHING IN A WIRELESS COMMUNICATION SYSTEM

(75) Inventor: Mun Yong Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 12/955,164

(22) Filed: Nov. 29, 2010

(65) Prior Publication Data

US 2011/0183694 A1  Jul. 28, 2011

Related U.S. Application Data

(60) Provisional application No. 61/298,158, filed on Jan. 25, 2010.

(30) Foreign Application Priority Data

May 19, 2010  (KR) .......................... 10-2010-0046790

(51) Int. Cl.
*H04M 1/00*  (2006.01)
(52) U.S. Cl.
USPC ................. 455/552.1; 455/550.1; 455/432.1; 455/433; 455/434; 455/435.1; 370/315; 370/316; 370/317; 370/318; 370/319

(58) Field of Classification Search
USPC ................ 455/550.1, 552.1, 432.1–448, 522, 455/69–70; 370/315–320
See application file for complete search history.

(56) References Cited

U.S. PATENT DOCUMENTS

2013/0045747 A1 *  2/2013  Islam et al. ................... 455/437

* cited by examiner

*Primary Examiner* — Fayyaz Alam
(74) *Attorney, Agent, or Firm* — Birch, Stewart, Kolasch & Birch, LLP

(57) ABSTRACT

A method and apparatus of cell searching in a wireless communication is disclosed. A method of cell searching in a user equipment of a wireless communication system, which supports a multi-mode, comprises the steps of generating a list of neighbor cells by measuring a power of each of the neighbor cells of first radio access technology (RAT) when the user equipment is operating in second RAT; and a first search step of searching for a cell, which can serve the user equipment, from the cells included in the list of neighbor cells if radio link failure is occurred in the second RAT.

16 Claims, 3 Drawing Sheets

METHOD AND APPARATUS OF CELL SEARCHING IN A WIRELESS COMMUNICATION SYSTEM

This application claims the benefit of Korean Patent Application No. 10-2010-0046790, filed on May 19, 2010, which is hereby incorporated by reference as if fully set forth herein.

This application also claims the benefit of U.S. Provisional Application Ser. No. 61/298,158, filed on Jan. 25, 2010, the content of which is hereby incorporated by reference herein in their entirety.

BACKGROUND OF THE INVENTION

1. Field of the Invention

The present invention relates to a wireless communication system, and more particularly, to a method and apparatus of cell searching in a wireless communication system.

2. Discussion of the Related Art

With the advent of various radio access technologies (RAT), a multi-mode user equipment that can support a plurality of radio access technologies has been developed.

If the radio link failure is occurred in the multi-mode user equipment which is operated in accordance with one RAT, it searches another RAT that can support a service and is operated in accordance with another RAT.

Accordingly, if the multi-mode user equipment is disconnected from the network, a cell searching method for searching for a cell of another RAT that can support a service is required.

In the method of cell searching according to the related art, the user equipment searches for a cell, which can support a service, by scanning all frequencies of RAT.

According to the related art, a problem occurs in that much time is required for cell searching if the multi-mode user equipment changes RAT.

SUMMARY OF THE INVENTION

As described above, according to the related art, a problem occurs in that much time is required for cell searching if the multi-mode user equipment changes RAT.

Accordingly, the present invention has been devised to solve the aforementioned technical problem, and an object of the present invention is to provide a method of cell searching, which can reduce the time required for cell searching when a multi-mode user equipment changes RAT.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of cell searching in a user equipment of a wireless communication system, which supports a multi-mode, comprises the steps of generating a list of neighbor cells by measuring a power of each of the neighbor cells of first radio access technology (RAT) when the user equipment is operating in second RAT; and a first search step of searching for a cell, which can serve the user equipment, from the cells included in the list of neighbor cells if radio link failure is occurred in the second RAT.

In this case, the method further comprises second search step of searching for a cell, which can serve the user equipment, by scanning a frequency used for last communication based on the first RAT if the user equipment fails to find out a cell, which can serve the user equipment, during the first search step.

Also, the method further comprises third search step of searching for a cell, which can serve the user equipment, by scanning all frequencies of the first RAT if the user equipment fails to find out a cell, which can serve the user equipment, during the second search step.

Also, the method further comprises performing any cell camping to receive a limited service if the user equipment fails to find out a cell, which can serve the user equipment, during the third search step.

Also, the user equipment includes a first RAT chip and a second RAT chip, and the method further comprises inactivating the second RAT chip and activating the first RAT chip if the user equipment finds out a cell, which can serve the user equipment, during the first search step.

Also, the user equipment searches the cells included in the list of neighbor cells in the order of a cell having the stronger power during the first search step.

In another aspect of the present invention, a user equipment of a wireless communication system, which supports a multi-mode, comprises a first RAT chip generating first list of neighbor cells by measuring a power of each of neighbor cells when the user equipment is operating in second RAT, and searching for a cell, which can serve the user equipment, from the cells included in the first list of neighbor cells if radio link failure is occurred in the second RAT; and a second RAT chip generating second list of neighbor cells by measuring a power of each of neighbor cells when the user equipment is operating in first RAT, and searching for a cell, which can serve the user equipment, from the cells included in the second list of the neighbor cells if radio link failure is occurred in the first RAT, wherein the first RAT chip supports communication in the first RAT and the second RAT chip supports communication in the second RAT.

In this case, the first RAT chip searches for a cell, which can serve the user equipment, by scanning a frequency used for the last communication based on the first RAT or a frequency of system information of the second RAT, which has been received from the network of the first RAT.

Also, the first RAT chip searches for a cell, which can serve the user equipment, by scanning all frequencies of the first RAT.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on that a mobile communication system is a 3GPP2 802.16 system, the following description can be applied to another random mobile communication system, excluding particular features of the 3GPP2 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a user equipment (UE) will refer to a mobile or fixed type user terminal device such as a mobile station (MS). Also, it is assumed that a base station will refer to a random node of a network terminal that performs communication with a mobile station, such as Node B and eNode B.

First of all, a multi-mode user equipment according to the embodiment of the present invention will be described with reference to FIG. 1.

Figure 1:
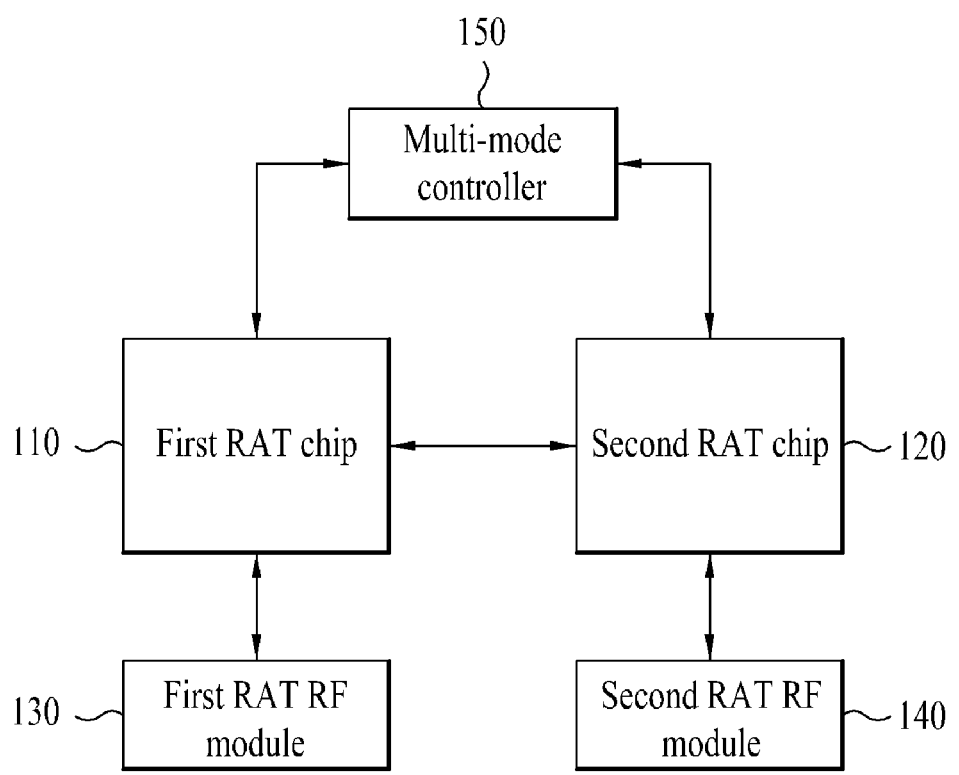
FIG. 1 is a diagram illustrating a multi-mode user equipment according to the embodiment of the present invention.

FIG. 1 is a diagram illustrating a multi-mode user equipment according to the embodiment of the present invention.

The multi-mode user equipment means a user equipment that can support a plurality of radio access technologies (hereinafter, referred to as "RAT"). Examples of the radio access technology include a global system for mobile communications (GSM), code division multiple access (CDMA), wideband CDMA (WCDMA), and a long term evolution (LTE). For example, the multi-mode user equipment may be a user equipment that supports the CDMA system and the LTE system at the same time.

As illustrated in FIG. 1, the multi-mode user equipment according to the embodiment of the present invention includes a first RAT chip 110, a second RAT chip 120, a first RAT radio frequency (RF) module 130, a second RAT RF module 140, and a multi-mode controller 150.

The first RAT chip 110 becomes active when the user equipment is operating in accordance with the RAT, and performs communication with the base station of the first RAT. If the first RAT chip 110 is requested from the base station of the first RAT to measure a power of each of neighbor cells of the second RAT chip, it requests the second RAT chip 120 to measure the power of each of the neighbor cells, receives information on the measured power of each of the neighbor cells and a list of neighbor cells from the second RAT chip 120, and stores them therein. If the first RAT chip 110 is disconnected from the network, it requests the second RAT chip 120 to perform a list search for searching for the list of the neighbor cells.

If the list search is failed, the first RAT chip 110 requests the second RAT chip 120 to perform a stored frequency search for searching for the frequency of the RAT stored in a universal subscriber identity module (USIM), a non-volatile memory (hereinafter, referred to as "NVRAM") or a system information block.

If the stored frequency search is failed, the first RAT chip 110 requests the second RAT chip 120 to perform an initial search for searching for all frequencies.

The first RAT chip 110 becomes inactive when the user equipment is operating in accordance with the second RAT. If the first RAT chip 110 is requested from the second RAT chip 120 to measure a power of each of neighbor cells of the second RAT chip, it measures the power of each of the neighbor cells and transmits the measured power of each of the neighbor cells to the second RAT chip 120. If the first RAT chip 110 is requested from the second RAT chip 120 to perform the list search, it performs the list search. If the first RAT chip 110 is requested from the second RAT chip 120 to perform the stored frequency search, it performs the stored frequency search. If the first RAT chip 110 is requested from the second RAT chip 120 to perform the initial search, it performs the initial search.

The second RAT chip 120 is operated in the same manner as the first RAT chip 110.

The first RAT RF module 130 transmits and receives a radio signal to and from the base station when the user equipment is operating in accordance with the first RAT. The second RAT RF module 140 transmits and receives a radio signal to and from the base station when the user equipment is operating in accordance with the second RAT.

If the multi-mode controller 150 fails to find out a cell, which can support a service, through the list search, the stored frequency search and the initial search, it performs any cell camping for a limited service. The limited service means a service that supports limited communication only such as emergency communication without supporting general communication. In other words, it fails to find out a cell, which can support a service, the user equipment camps in a random cell to receive a limited service.

An interface for information transmission is provided between the first RAT chip 110 and the second RAT chip 120. The first RAT chip 110 and the second RAT chip 120 transmit and receive message and information required for cell search, to and from each other.

Next, a method of cell searching in a wireless communication system according to the embodiment of the present invention will be described with reference to FIG. 2 and FIG. 3.

Figure 2:
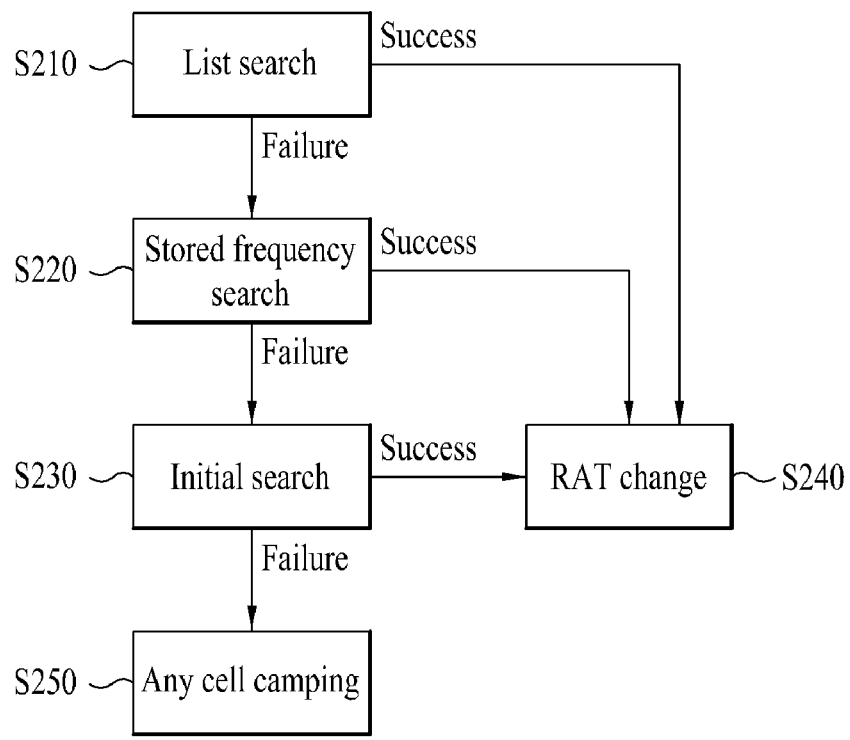
FIG. 2 is a flow chart illustrating a method of cell searching according to the embodiment of the present invention.
Figure 3:
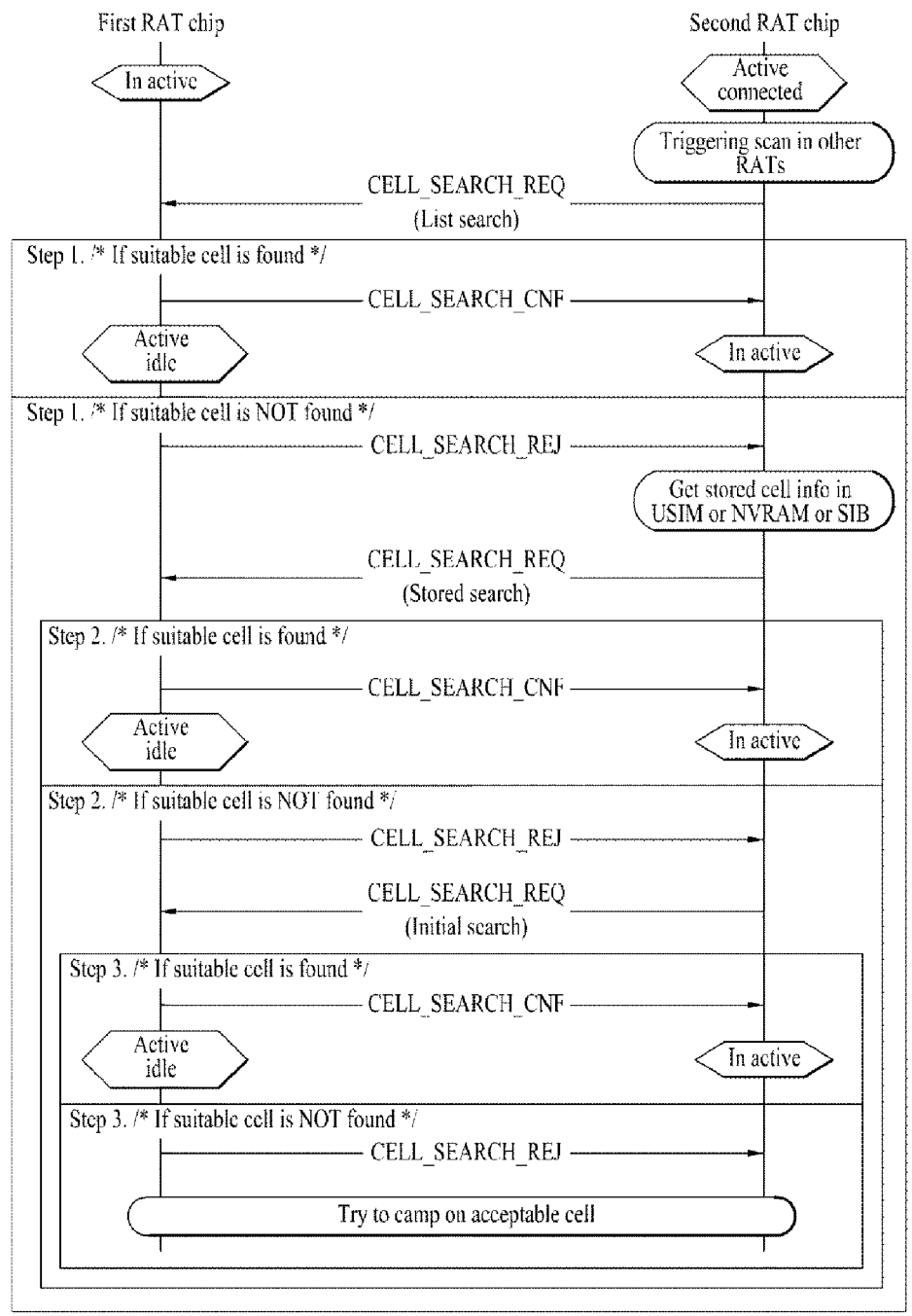
FIG. 3 is a diagram illustrating a procedure of transmitting and receiving a message to and from a first RAT chip and a second RAT chip in the method of cell searching according to the embodiment of the present invention.

FIG. 2 is a flow chart illustrating a method of cell searching according to the embodiment of the present invention, and FIG. 3 is a diagram illustrating a procedure of transmitting and receiving a message to and from a first RAT chip and a second RAT chip in the method of cell searching according to the embodiment of the present invention.

When the multi-mode user equipment is operating in accordance with the first RAT, the first RAT chip becomes active while the second RAT chip becomes inactive. On the other hand, when the multi-mode user equipment is operating in accordance with the second RAT, the second RAT chip becomes active while the first RAT chip becomes inactive. If the multi-mode user equipment is disconnected from the network when the multi-mode user equipment is operating in accordance with the second RAT, it searches for cells of the first RAT, and performs RAT change if it finds out an accessible cell. If the multi-mode user equipment performs RAT change, the active second RAT chip becomes inactive while the inactive first RAT chip becomes active.

If the multi-mode user equipment is disconnected from the network when the multi-mode user equipment is operating in accordance with the second RAT, it performs the list search to search for the cells of the first RAT (S210).

As illustrated in FIG. 3, if the multi-mode user equipment is disconnected from the network when the multi-mode user equipment is operating in accordance with the second RAT, the second RAT chip transmits a cell search request (CELL_SEARCH_REQ) message to the first RAT chip to request the list search.

When the multi-mode user equipment is operating in accordance with the second RAT, it may be requested from the network to measure a power of each of neighbor cells. At this time, the user equipment also receives a frequency bandwidth for searching, from the network. Then, the active second RAT chip transmits the received frequency bandwidth to the first RAT chip. The first RAT chip finds out the neighbor cells by searching for the received frequency bandwidth and measures the power of each of the neighbor cells. The first RAT chip transmits the list of neighbor cells and information on the power of each of the neighbor cells to the second RAT chip.

In a state that the second RAT chip stores the list of neighbor cells and the information on the power of each of the neighbor cells, if the second RAT chip is disconnected from the network, it transmits the list of neighbor cells and the information on the power of each of the neighbor cells to the first RAT chip together with the CELL_SEARCH_REQ message. Then, the first RAT chip searches for the cells of the list of neighbor cells as to whether there exists a cell, which can support a service. The first RAT chip searches whether a corresponding cell can serve the user equipment by receiving system information (SI) from the cells included in the list of neighbor cells. At this time, the first RAT chip searches for the possibility of camping for the cells included in the received list of neighbor cells in the order of the cell having the stronger power.

If the first RAT chip searches for the cell, which can serve the user equipment, from the cells included in the list of neighbor cells, the user equipment performs RAT change (S240).

If the first RAT chip searches for the cell, which can serve the user equipment, from the cells included in the list of neighbor cells, it transmits a cell search confirmation (CELL_SEARCH_CNF) message to the second RAT chip, and the user equipment performs RAT change and camps in the searched cell. Then, the first RAT chip becomes active while the second RAT chip becomes inactive.

If the first RAT chip fails to find out the cell, which can serve the user equipment, from the cells included in the list of neighbor cells, it transmits a cell search reject (CELL_SEARCH_REJ) message to the second RAT chip.

If the user equipment fails to find out the cell, which can serve the user equipment, through the list search, it performs the stored frequency search (S220).

The user equipment stores the frequency used for the last communication based on specific RAT in the USIM or NVRAM. When the user equipment is operating in accordance with RAT 2 during current communication, it receives frequency information of RAT 1 through a network of the RAT 2 and stores the received frequency information in a system information block.

The stored frequency search is to search for a cell by using the frequency of RAT, which is stored in the USIM, NVRAM or system information block.

Referring to FIG. 3, the second RAT chip that has received the CELL_SEARCH_REJ message transmits the CELL_SEARCH_REQ message to the first RAT chip to request the stored frequency search.

The first RAT chip that has received the CELL_SEARCH_REQ message finds out a cell for service by scanning the frequency of the first RAT stored in the USIM, NVRAM or system information block.

If the first RAT chip finds out a cell, which can serve the user equipment, from the cells of the list of neighbor cells, the user equipment performs RAT change (S240).

If the first RAT chip finds out a cell, which can serve the user equipment, it transmits a CELL_SEARCH_CNF message to the second RAT chip, and the user equipment performs RAT change and camps in the found cell. Then, the first RAT chip becomes active while the second RAT chip becomes inactive.

If the first RAT chip fails to find out a cell, which can serve the user equipment, it transmits the CELL_SEARCH_REJ message to the second RAT chip.

If the user equipment fails to find out a cell, which can serve the user equipment, through the stored frequency search, it performs initial search (S230).

The initial search is to find out a cell by searching for all frequencies of the RAT.

Referring to FIG. 3, the second RAT chip that has received the CELL_SEARCH_REJ message transmits the CELL_SEARCH_REQ message to the first RAT chip to request the initial search.

The first RAT chip that has received the CELL_SEARCH_REQ message finds out a cell for service by scanning all the frequencies of the first RAT.

If the first RAT chip finds out a cell, which can serve the user equipment, from the cells of the list of neighbor cells, the user equipment performs RAT change (S240).

If the first RAT chip finds out a cell, which can serve the user equipment, it transmits the CELL_SEARCH_CNF message to the second RAT chip, and the user equipment performs RAT change and camps in the found cell. Then, the first RAT chip becomes active while the second RAT chip becomes inactive.

If the first RAT chip fails to find out a cell, which can serve the user equipment, it transmits the CELL_SEARCH_REJ message to the second RAT chip.

If the user equipment fails to find out a cell, which can serve the user equipment, through the list search, the stored frequency search and the initial search, it performs any cell camping to receive a limited service (S250).

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

According to the embodiments of the present invention, it is possible to quickly and efficiently search for the cell through a cell searching process of three steps.

It is to be understood that the advantages that can be obtained by the present invention are not limited to the aforementioned advantages and other advantages which are not mentioned will be apparent from the following description to the person with an ordinary skill in the art to which the present invention pertains.

What is claimed is:

1. A method of cell searching in a user equipment of a wireless communication system that supports a multi radio access technology (RAT), the method comprising:
   performing a first search process using a neighbor cell list when a link failure occurs, the first search process using a serving cell of an active RAT, the neighbor cell list being generated by measuring a power of each of neighbor cells of inactive RATs before the link failure occurs;

when the first search process fails, performing a second search process using a stored cell information which is stored in a non-volatile memory of the user equipment; and when the second search process fails, performing a third search process by scanning all frequencies of the inactive RATs.

2. The method as claimed in claim 1, wherein the user equipment includes a first RAT chip and a second RAT chip, the method further comprising inactivating the second RAT chip and activating the first RAT chip if the user equipment finds a cell that can serve the user equipment.

3. The method as claimed in claim 1, wherein the user equipment searches for a cell, which can serve the user equipment, in an order of a cell having the stronger power.

4. A user equipment for cell searching in a wireless communication system that supports a multi-radio access technology (RAT), the user equipment comprising:

a transceiver unit to transceive signals; and a controller which is configured to:

perform a first search process using a neighbor cell list when a link failure occurs, the first search process using a serving cell of an active RAT, the neighbor cell list being generated by measuring a power of each of neighbor cells of inactive RATs before the link failure occurs;

when the first search process fails, performing a second search process using a stored cell information which is stored in a non-volatile memory of the user equipment; and when the second search process fails, performing a third search process by scanning all frequencies of the inactive RATs.

5. The user equipment as claimed in claim 4, wherein the user equipment further comprises a first RAT chip and a second RAT chip, wherein the first RAT chip is used for generating the neighbor cell list when the second RAT chip serves in the second RAT.

6. The user equipment as claimed in claim 5, wherein the first RAT chip searches for a cell, which can serve the user equipment, by scanning a frequency of system information of the first RAT.

7. The user equipment as claimed in claim 5, wherein the first RAT chip searches for a cell, which can serve the user equipment, by scanning all frequencies of the first RAT.

8. The method as claimed in claim 1, wherein the first search process, the second search process, and the third search process are attempted in sequence after the link failure occurs.

9. The method as claimed in claim 1, wherein the neighbor cell list includes information of neighbor cells having a power more than a reference power.

10. The method as claimed in claim 1, wherein the non-volatile memory includes a flash memory or a universal subscriber identity module (USIM).

11. The method as claimed in claim 1, wherein the stored cell information includes information used for a last communication in the inactive RATs.

12. The method as claimed in claim 1, wherein if the third search process is failed, performing an any cell camping process to receive a limited service, and wherein the first search process, the second search process, the third search process, and the any cell camping process are attempted in sequence after the link failure occurs.

13. The user equipment as claimed in claim 4, wherein the first search process, the second search process, and the third search process are attempted in sequence after the link failure occurs.

14. The user equipment as claimed in claim 4, wherein the neighbor cell list includes information of neighbor cells having a power more than a reference power.

15. The user equipment as claimed in claim 4, wherein the non-volatile memory includes a flash memory or a universal subscriber identity module (USIM).

16. The user equipment as claimed in claim 4, wherein the stored cell information includes information used for a last communication in the inactive RATs.

* * * * *